March 13, 1945.  B. W. MANTLE  2,371,399
METHOD OF MAKING BEARINGS
Filed May 25, 1942  2 Sheets-Sheet 1
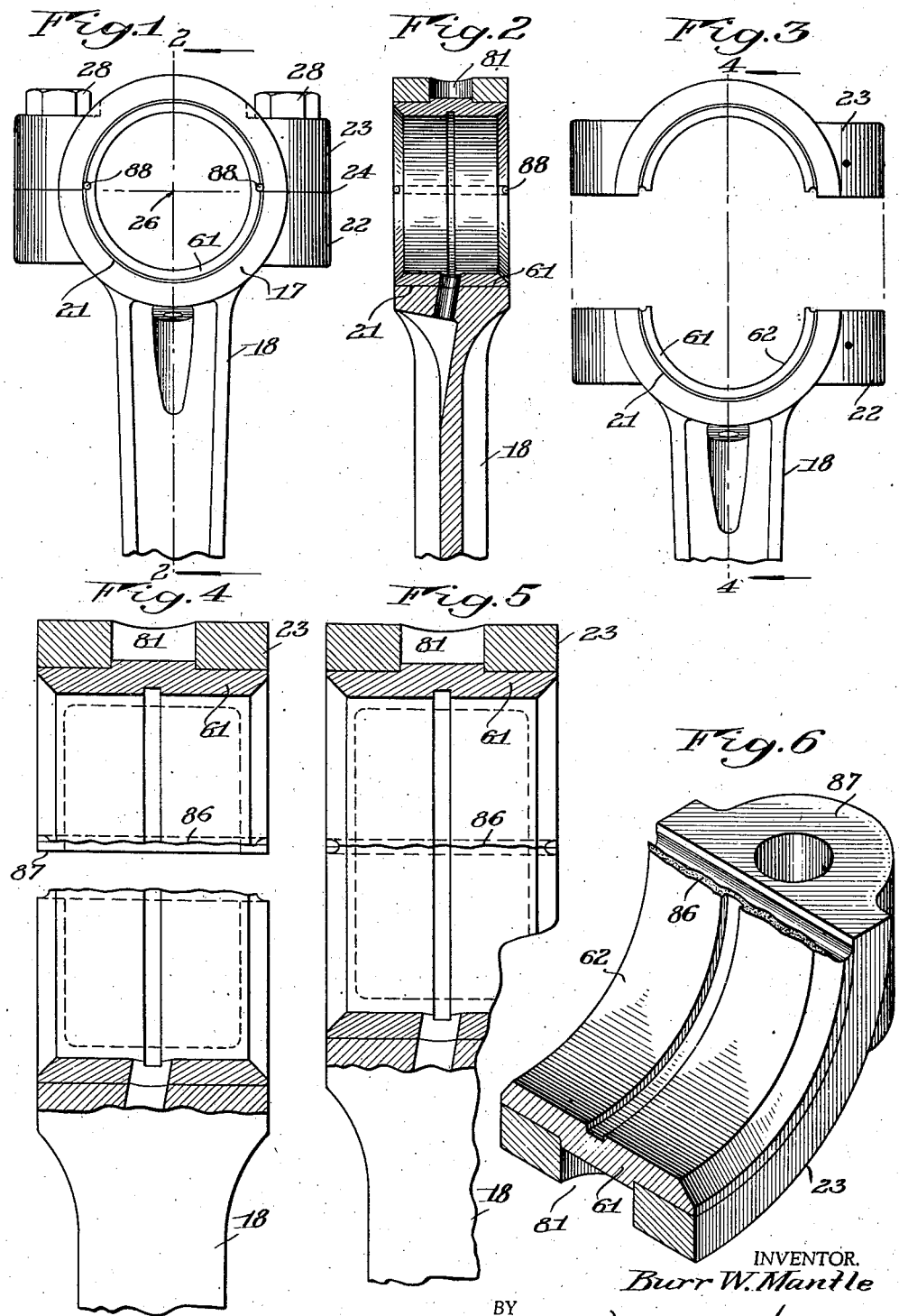
INVENTOR.
Burr W. Mantle
BY Winslow E. Thomson
his Attorney March 13, 1945. B. W. MANTLE 2,371,399
METHOD OF MAKING BEARINGS
Filed May 25, 1942 2 Sheets-Sheet 2
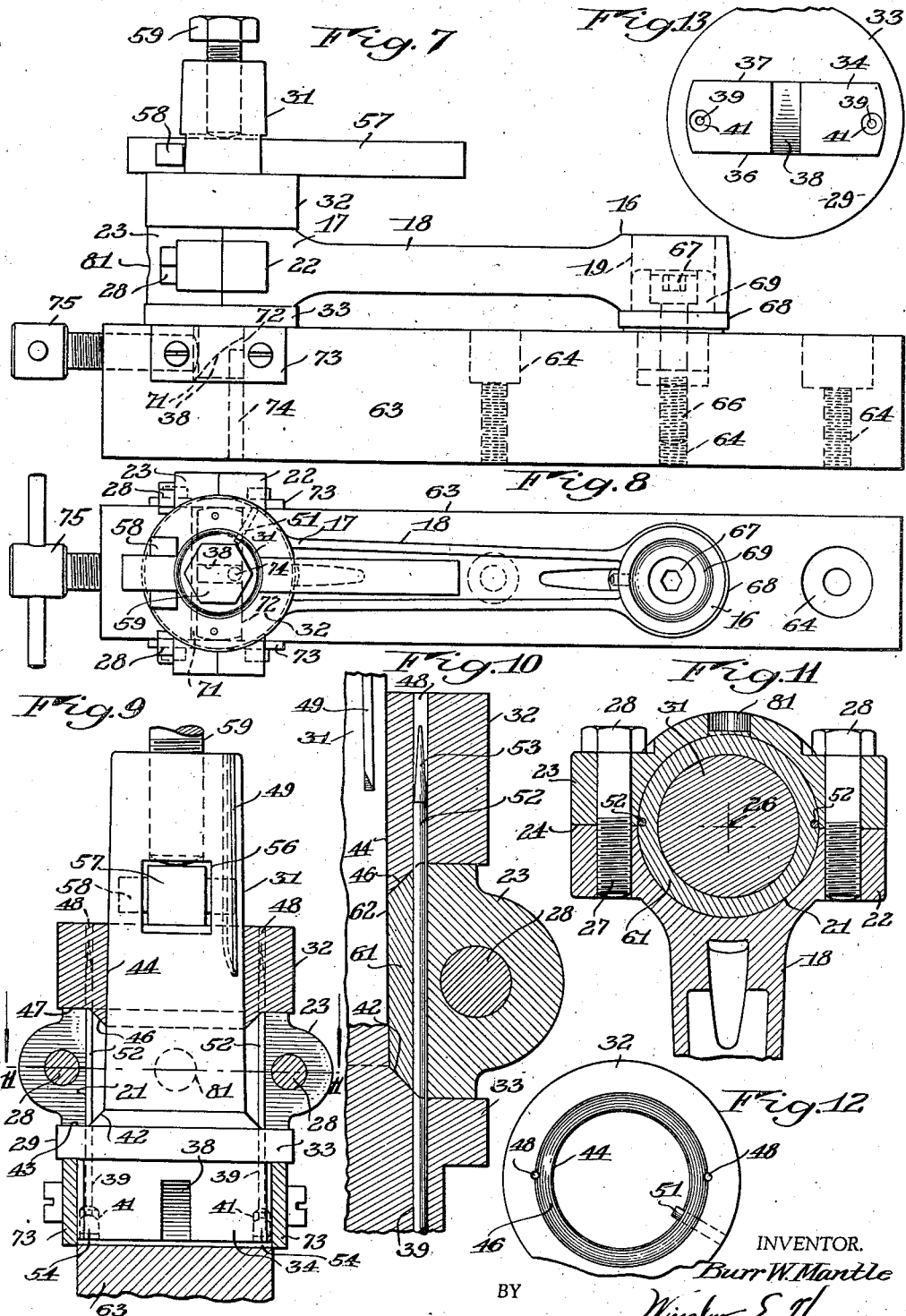
INVENTOR.
Burr W. Mantle
BY Winslow E. Thurson
his Attorney Patented Mar. 13, 1945

2,371,399

UNITED STATES PATENT OFFICE 2,371,399

METHOD OF MAKING BEARINGS

Burr W. Mantle, Pittsford, N. Y., assignor to American Brake Shoe Company, a corporation of Delaware Application May 25, 1942, Serial No. 444,372

9 Claims. (Cl. 29—149.5)

My invention relates to a method of making bearings. While the principles of my invention will be described in connection with the making of a bearing for a connecting rod, the invention, or at least most of the features thereof, has wider application and may be employed in making bearings generally, and particularly in making those bearings which must be made in two parts for the purpose of enabling the bearing to be encircled about a shaft or other cooperating element.

In providing a two part bearing for a machine element, such as the bearing located at the crank end of a connecting rod, a number of methods of manufacture are in common use. Some manufacturers prefer to provide the bearing cavity with separate preformed bearing shells lined, for example, with Babbitt metal. Others prefer to cast or spin the bearing metal into the bore of the connecting rod.

One conventional method of babbitting the crank end of a connecting rod is to separately babbitt the bearing cavity of the rod proper and the bearing cavity of the cap. The surfaces are then scraped or cleaned. After the rod and cap are bolted together the necessary machine work may be done. This method has the advantage that it is unnecessary to cut the babbitt at the rod and cap intersection since these parts are separately cast. However, this advantage is accompanied by the disadvantage, among other things, that two casting operations are required.

In other known methods of babbitting the complete annular bearing is formed in one operation. This is accomplished either by spinning the babbitt into the bearing cavity while rotating the rod at a suitable speed, or by providing the rod with a fixture part of which constitutes a mold and pouring the Babbitt metal into the mold thus formed. While the bearing may be split by employing a shim or partition either when the bearing is spun or cast, frequently the rod and the cap portions of the bearing are divided by sawing the bearing after the bearing metal has solidified. Cutting the babbitt at the intersection of the cap and rod not only requires additional and costly machining operations, but also results in breaks in the continuity of the bearing surface along the lines of sawing. This causes breaks in the oil film on the bearing, thereby reducing the allowable bearing pressure on the rod.

All of the above methods are objectionable for one reason or another. Most of them require considerable and costly machining of the parts and result in a bearing surface which is not smooth, continuous and unbroken throughout its annular extent. Moreover, some of the above mentioned methods necessitate excessive handling of the parts, particularly due to the fact that the cap and the rod must be separated and reassembled several times during the process of manufacture.

An object of my invention is to provide a method of making bearings which enables the production of bearings more cheaply and quickly than the methods of the prior art.

Another object of my invention is to provide a method of making two part bearings in which the number of machining operations required during production is materially reduced and in which the two parts of the bearing, as for example, the cap and the head, or rod proper, of a connecting rod, do not have to be separated and reassembled until the bearing is ready to be placed in cooperative relation with its associated shaft.

Another object of my invention is to provide a method of making bearings of the multiple part type which results in producing a smooth, continuous and, for practical purposes, unbroken annular bearing surface to thus produce a bearing on which the oil film is continuous throughout its annular extent.

A further object of my invention is to provide a method of making bearings, particularly adapted for making the bearing for the crank end of a connecting rod, which lends itself to high-speed production, a minimum of machining operations and a minimum of handling of parts during the process of manufacture.

Other objects and advantages of my invention will be set forth in the appended claims and will clearly appear from the following description, when taken in connection with the accompanying drawings, in which:

Fig. 1 is a plan view of the crank end of a connecting rod employing the bearing of and made by the method of my invention, showing the parts as they appear prior to "breaking" the bearing;

Fig. 2 is a view taken substantially on the line 2—2 of Fig. 1, also showing the crank end of the connecting rod prior to "breaking" the bearing;

Fig. 3 is a view similar to Fig. 1 with the bolts between the cap and the rod removed, with the bearing "broken" and the cap and rod separated;

Fig. 4 is a view taken substantially on the line 4—4 of Fig. 3;

Fig. 5 is a view similar to Fig. 4 showing the cap reassembled with respect to the rod and with the line of bearing "break" somewhat exaggerated for the purpose of illustration;

Fig. 6 is a perspective view showing a part of the cap of the connecting rod;

Fig. 7 is a side elevation showing the connecting rod mounted in its babbitting fixture and the babbitting fixture and connecting rod mounted in their supporting adapter or fixture;

Fig. 8 is a plan view of Fig. 7;

Fig. 9 is a sectional view taken through the connecting rod head, the babbitting fixture and the supporting adapter or fixture;

Fig. 10 is an enlarged view of a portion of Fig. 9;

Fig. 11 is a view taken substantially on the line 11—11 of Fig. 9;

Fig. 12 is a bottom view of the collar of the babbitting fixture; and

Fig. 13 is a bottom view of the base of the babbitting fixture.

The principles of my invention are applicable to bearings generally and particularly to that type of bearing which is made in two separable parts for the purpose of enabling the bearing to be encircled about a shaft, crank or other cooperating member. For purposes of illustration, and not by way of limitation, the invention is described herein in connection with the manufacture of a bearing for the crank end of a connecting rod. The connecting rod or pitman, as shown in the drawings, comprises a wrist pin end 16 (Fig. 7) and a crank end or head 17 which are joined by a connecting piece or shank 18. The wrist pin end of the connecting rod is provided with a bore 19 while the head is provided with a bore 21. The connecting rod parts may be integral of cast iron or any other suitable material, the material depending upon the service to which the connecting rod is to be put. The particular connecting rod illustrated in the drawings is a forging but this fact is, of course, immaterial to the invention.

The connecting rod head comprises two major parts, a rod proper part 22 and a cap part 23. In the preferred practise the rod, after bolt openings are bored as shown, in saw cut along a plane 24 which preferably extends through the axis 26 of the bore 21. This enables the parts to be encircled about a shaft where it is not feasible to slip the connecting rod endwise onto the shaft. The rod part 22 is threaded, as shown at 27, for the reception of bolts 28 employed for the purpose of rigidly clamping the cap with respect to the connecting rod proper.

After the above mentioned operations have been completed the cap and rod are bolted together preparatory to pouring the crank end bearing. One of the purposes of the method of my invention is to avoid the necessity, during the making of the bearing and the machining of the parts, of removing the bolts 28 and taking the connecting rod head apart. With my method the parts do not have to be separated except when the connecting rod is to be assembled with respect to its cooperating shaft. This results in an appreciable saving in production time. The bore 21, prior to pouring the bearing metal, is preferably tinned to enable the bearing metal to more readily bond with the metal of the connecting rod. While tinning is not entirely necessary with a forging, it is the usual practice to use some material which will serve to provide a better bond for the bearing metal. Any suitable bearing metal may be used but I prefer to use the conventional bearing metal alloy known as Babbitt metal.

For the purpose of carrying out the novel method of my invention, I have developed a novel babbitting fixture the details of which are shown clearly in Figs. 7 to 13 inclusive. While other babbitting fixtures might be employed, I have found the particular fixture illustrated in the drawings to be extremely convenient to use and particularly adapted to high speed production. The babbitting fixture comprises a base, generally indicated by the numeral 29, a central post or mandrel 31 and a collar 32. The base 29 of the fixture is integral with the mandrel 31 and has a cylindrical part 33 and a seat part 34. A bottom view of the base of the fixture is shown in Fig. 13 which shows the seat part to include a section of metal which has preferably two straight parallel side walls 36 and 37 which are preferably connected at their ends by arcs of circles. The seat part 34 has milled therein a keyway 38 cut on the arc of a circle (Fig. 7) for a purpose which will more clearly appear later.

Extending through the base of the fixture is a pair of openings 39 the lower ends of which are provided with counter sinks 41. The mandrel 31 has a frustro-conical part 42 which, together with the surface 43, is machined accurately to provide smooth surfaces. The frustro-conical part 42 merges into the mandrel proper which is provided with a slight taper throughout its length to facilitate removal of the mandrel from the bore after the bearing metal has solidified. It will, of course, be appreciated that the diameter of the mandrel corresponds to the desired internal diameter of the bearing (plus the amount allowed for boring the bearing to provide a finished bearing surface).

The collar 32 has a central bore 44 which is provided with a taper corresponding to that of the mandrel. The lower face of the collar 32 is provided with a frustro-conical part 46 similar to the frustro-conical part 42. A bottom view of the collar is shown in Fig. 12. The frustro-conical part 46, together with the surface 47, is accurately machined to provide smooth surfaces. The collar has two openings 48 which are adapted to be brought into registry with the openings 39 in the base. Means are provided for insuring that these sets of openings 39 and 48 will register with each other when the parts are assembled. For this purpose the mandrel has cut therein a longitudinally extending slot 49 and the collar is provided with a pin 51 which projects into the bore of the collar, as shown most clearly in Fig. 12. Thus when the collar is slipped on the mandrel the pin 51 is brought into registry with the slot 49, thus insuring that the openings 48 will be in registry with the openings 39.

For a purpose which will later appear, the openings 39 and 48 are adapted to receive rods or pins 52 which are preferably provided with pointed upper ends, as shown at 53, (Fig. 10) and flattened lower ends, as shown at 54. The pins 52 may be of any suitable shape but are preferably circular in cross section and are also preferably of a diameter less than the thickness of the wall of the bearing which is to be formed. Preferably also the pins are of a metal which is not affected by the molten temperature of the bearing metal and of a metal to which Babbitt metal does not adhere. For these reasons the pins are preferably made of steel.

The upper end of the mandrel has a transversely extending, preferably rectangular, opening or keyway 56 which is adapted to receive a key or cross pin 57. The cross pin 57 is provided with a pin 58 which extends on opposite sides of the cross pin and is longer than the width of the opening 56. The upper end of the mandrel is internally threaded to receive a pressure screw 59.

It will now be apparent, when the parts are assembled as shown in Fig. 9 with the connecting rod in position on the mandrel, that the collar 32 may be slipped on the mandrel and accurately positioned with respect to the base by the pin and slot construction above described. The cross pin is then placed in position in which position it bears upon the upper surface of the collar as shown in the drawings. Upon tightening the pressure screw 59 the lower end of which engages the cross pin, pressure may be applied on the collar to clamp the connecting rod between the surfaces 43 and 47. Sufficient pressure may be applied to prevent a leakage of bearing metal at the mating surfaces when the babbitt is poured.

The fixture thus provides a mold, having an accurately dimensioned space 61 for the reception of the bearing metal. It will be particularly noted that the frustro-conical portions 42 and 46 define the ends of the bearing and that the taper or chamfer on the bearing formed by these frustro-conical parts recesses the ends of the bearing below the adjacent faces of the connecting rod. Thus in service the bearing does not contact the adjacent surfaces of the crank with respect to which the connecting rod is assembled. The taper or chamfer on the ends of the bearing in the form in which it is cast, brings the babbitt away from the fillets in the crank shaft. This makes it unnecessary to machine the ends of the bearing and results in a further appreciable saving in production costs.

One of the important features of the method of my invention and the babbitting fixture thereof lies in the fact that the pins 52 are spaced so as to engage the walls of the bore 21. Thus the pins serve to accurately centralize the connecting rod bore with respect to the mandrel and insure a uniform thickness of annular bearing wall. For a purpose which will later be apparent, as most clearly appears from Fig. 11, the pins are appreciably smaller in diameter than the thickness of the bearing wall so that they are located entirely in the bearing body 61 and spaced inward from the bearing surface 62. It will further be noted that the pins are located so that they lie to one side of the plane of separation of the connecting rod head formed by the saw slots 24. This plane includes within it the axis 26 of the bore. While the pins could be located on either side of this plane for reasons which will later appear it is desirable that the pins be located on the cap side of this plane.

After the connecting rod has been loosely assembled in the babbitting fixture and without tightening the pressure screw 59, the connecting rod, together with the babbitting fixture, is placed in a connecting rod adapter or fixture, generally indicated by the numeral 63 and most clearly shown in Figs. 7 and 8. The connecting rod adapter 63 has a plurality of openings or sockets 64. A member 68 having a boss 69 is held in position in the socket 64 by a screw 67 threaded at 66. The diameter of the boss 69 corresponds to the diameter of the connecting rod wrist pin bore. The boss 69 accurately aligns the connecting rod vertically. It will be appreciated that the connecting rod adapter 63 is suitable for use with connecting rods of various lengths and that any desired number of sockets 64 may be provided therein.

The connecting rod adapter is provided with a transverse slot or socket 71 adapted to receive the seat 34 formed on the base of the mandrel. The slot 71 has a surface 72 which is accurately formed to cooperate with the surface 36 on the seat to aid in aligning the parts. That is the plane of the surface 72 is normal to the line which will be occupied by the line joining the axes of the bores when the parts are properly positioned. The seat 34 is confined against sideward movement by side plates 73 which normally remain tightened in position. Sufficient clearance is provided to permit the seat to be slipped into position in the socket 71 and fit snugly between the side plates. It will be noted that the surfaces joining the straight sides 36 and 37 of the seat are arcs of circles. Thus even should the seat be slightly cocked with respect to the slot, the center of the crank end bore will be accurately positioned and the surface 72 will be normal to the line joining the axes of the wrist pin and crank end bores.

The connecting rod adapter is provided with a locating pin 74 which is adapted to register with the arcuate slot 38 in the seat. Due to the fact that the slot 38 is formed on an arc of a circle the babbitting fixture can be placed in only one position in the transverse slot or socket 71. This insures that the pins 52 will lie in the cap part of the connecting rod head, as shown in Fig. 8. A hand screw 75 threaded into the connecting rod adapter 63 has its end projecting into the transverse slot 71 and enables the application of pressure on the seat 34 so as to press the faces 36 and 72 into engagement with each other.

In the practice of the invention the connecting rod is loosely assembled in its babbitting fixture. The connecting rod and babbitting fixture are then placed in the connecting rod adapter. The hand screw 75 is tightened after which pressure may be applied by means of the pressure screw 59 to rigidly clamp the connecting rod. The cooperation of the surfaces 27 and 36, when pressure is applied by means of the hand screw 75, will insure that the parts are in alignment and that the pins 52 lie in a plane (Fig. 8) perpendicular to the line adjoining the centers of the bores 19 and 21 and substantially parallel to the plane of separation of the cap from the rod proper. Moreover, with the pins 52 in this position, the wall of the crank end bore 21 is accurately spaced and centered with respect to the mandrel so as to insure a uniform bearing wall thickness.

After the parts have been aligned, in the manner above described, the connecting rod, together with the babbitting fixture and adapter, is moved to a vertical position and the bearing metal poured through the opening 81 in the wall of the cap. If desired, for pouring the bearing the hand screw 75 may be loosened and the babbitting fixture, together with the connecting rod, removed from the connecting rod adapter 63. The connecting rod and babbitting fixture may then by means of the cross pin, be hung on a suitable rack during pouring. The pins 52 are wedged in the openings 39 and 48 due to the fact that the ends are flattened. This prevents the pins from dropping out. When used in this manner the connecting rod adapter 65 serves merely as a device for aligning the parts preparatory to tightening the pressure screw 59.

Of particular importance is the fact that the opening for pouring the Babbitt metal is arranged so that it lies at the top of the bearing when the babbitt is being poured. By this arrangement the mold is self-venting. Moreover, the location of the pouring opening in the top of the cap, makes it unnecessary to grind or smooth off any riser at the pouring opening.

After the bearing metal has solidified the pressure screw 59 is loosened and the cross pin 57 removed. The mandrel, by reason of the taper of the parts, may then be driven or pressed through the bearing pulling with it the pins 52. After removal from the babbitting fixture the rod is placed in a high speed boring machine and both bearings accurately bored in one clamping of the rod, the taper of the crank bearing being removed in this boring operation. The rod, after inspection, is then ready for assembly on the machine with which it is to be used.

In the assembly of the connecting rod with respect to its shaft or crank it is for the first time necessary to remove the cap from the rod. This is an important advantage in my method of babbitting for the reason that considerable time, in most of the conventional methods of babbitting, is lost due to the fact that the cap must be removed and reassembled with respect to the connecting rod several times during the course of manufacture. After the removal of the bolts the cap is broken off the rod, either by a sudden jar or by holding the cap in a vise and pushing sidewardly on the rod. Breaking of the bearing is facilitated due to the fact that the removal of the pins 52 leaves openings 88 in the body of the bearing. These openings weaken the bearing in a plane substantially passing through the centers of these openings. This plane lies substantially parallel to the line of separation of the cap and connecting rod proper but is, in the preferred form of the invention, slightly out of coincidence therewith for a purpose which will later appear.

The babbitt breaks off to form jagged edges across both sides of the bearing, as illustrated at 86 in Figs. 4, 5 and 6. These jagged edges are precisely complimentary to each other so that when the bearing parts are fitted together a perfect contact is made and only an almost invisible line of break exists. In the drawings for purposes of illustration, I have exaggerated the lines of break. However, when the parts are placed together the bearing surface is smooth and for all practical purposes unbroken. Since substantially perfect contact between the broken parts of the bearing is made, the oil film on the bearing is in no way broken and the allowable bearing pressure is substantially that which would be permitted with a solid bearing.

One important feature of my invention lies in the fact that the jagged edges 86 (Fig. 6) lie below the machined surfaces 87 of the cap due to the fact that the plane of the openings 88 formed by the pins 52 is out of coincidence with the plane of separation of the cap from the rod proper. While the openings 88 might be placed on the rod proper side of the plane of separation, I prefer to locate the openings 88 as shown so as to enable the bearing to be more readily taken up in service. Thus in service should the bearing become worn, the cap may be removed, placed in a vise and the surfaces 87 filed without removing the connecting rod. Since the jagged edges 86 lie below the surfaces 87, the filing of the surfaces 87 in no way affects the bearing.

After the two surfaces 87 have been filed and the bearing is reassembled about its crank shaft, the application of pressure on the screws or bolts 28 causes a pressure on the bearing. Since the Babbitt metal is softer than the metal of the associated shaft, the bearing surface will conform itself to the shaft. Whatever excess bearing metal exists, as a result of filing the surfaces 87, will tend to cold flow into the openings 88 in the bearing body. Thus the precise complimentary mating of the jagged edges, produced when the bearing is broken, may be preserved even should adjustment of the bearing in service be required.

While I have described my invention as being produced by casting the bearing, it would be possible to use the same general principles of my invention and spin the babbitt into the bore of the connecting rod. Morover, while I have shown and described the openings 88 in the bearing body as being produced during the casting of the bearing, it will be appreciated that if desired these openings can be bored after the bearing metal has solidified. While this procedure would enable the accomplishment of the general principles of my invention, it would be more costly since additional machine operations would be required.

I have shown and described the pins as extending completely through the bearing. This is, of course, not essential. All that is required is that the bearing be sufficiently weakened to permit fracture, as described above. This could be accomplished by extending the pins partway through the bearing. Moreover, while I have described the use of metal pins, fragile pins as, for example, of suitable plastic, might be employed. Such plastic pins could be easily sheared off and removed after the two parts of the bearing have been broken in the manner above described.

It will be appreciated that the pins 52 not only serve to produce the openings which enable the convenient breaking of the bearing and provide space for the cold flow of the bearing metal, but also that the pins serve an important function in aligning the parts. Only two pins are necessary for this later function, when the wrist pin is accurately located, as above described. However, if the principles of my invention were employed in producing, for example, a two part sleeve type bearing it would be desirable to employ two additional pins spaced 90 degrees with respect to the present pins. Moreover, if a plane of break for the bearing were not desired three pins would be sufficient, if properly located to define a circle and prevent movement of the connecting rod after being placed in position with respect to the pins.

While I have described in detail my method of making a bearing, have shown and described the novel fixtures which may be employed in making the bearing and have also described the bearing produced thereby and shown the advantages thereof as an article of manufacture, it will be appreciated that various changes and modifications may be made without departing from the spirit of my invention as set forth in the appended claims.

I claim:

1. In a method of providing a member having separable parts with a bearing surface, the steps which comprise flowing the bearing material over the portion of the member to be thus provided to form a bearing body having a bearing surface upon solidification of the bearing material, weakening the bearing body along at least one line lying between the bearing surface and the member, breaking the bearing material approximately along said line for a separation of the member into parts, each carrying a portion of the bearing material and bearing surface, and placing said parts together around the element with which the member is to be associated to form smooth joints along the line upon which the bearing surface has been broken.

2. In a method of providing a member having separable parts with a bearing surface, the steps which comprise flowing the bearing material over the portion of the member to be thus provided to form a bearing body having a bearing surface upon solification of the bearing material, weakening the bearing body prior to solidification between the bearing surface and the member, breaking the bearing material adjacent the weakening for separation of the member into parts, each carrying a portion of the bearing material and bearing surface, and placing said parts together around the element with which the member is to be associated to form smooth joints along the line upon which the bearing surface has been broken.

3. In a method of providing a member having separable parts with a bearing surface, the steps which comprise flowing the bearing material over the portion of the member to be thus provided to form a bearing body having a bearing surface upon solidification of the bearing material, weakening the bearing body prior to solidification along at least two lines lying between the bearing surface and the member, breaking the bearing material approximately along said lines for a separation of the member into parts, each carrying a portion of the bearing material and bearing surface, and placing said parts together around the element with which the member is to be associated to form smooth joints along the lines upon which the bearing surface has been broken.

4. In a method of providing a member having separable parts with a bearing surface, the steps which comprise flowing the bearing material over the portion of the member to be thus provided to form a bearing body having a bearing surface upon solidification of the bearing material, forming openings in the bearing body prior to solidification along at least two lines lying between the bearing surface and the member, breaking the bearing material approximately along the lines of said openings for a separation of the member into parts, each carrying a portion of the bearing material and bearing surface, and placing said parts together around the element with which the member is to be associated to form smooth joints along the lines upon which the bearing surface has been broken.

5. In a method of providing a member having separable parts with a bearing surface, the steps which comprise flowing the bearing material over the portion of the member to be thus provided to form an annular bearing body having a bearing surface upon solidification of the bearing material, said annular bearing body having a lengthwise axis, weakening the bearing body without breaking the bearing surface along two lines extending approximately parallel to said axis of the annulus and lying approximately diametrically opposite each other breaking the bearing material approximately along said two lines, for a separation of the member into parts each carrying a portion of the bearing material and bearing surface, said two lines being both on the same side of a plane in which the axis lies, and placing said parts together around the element with which the member is to be associated to form smooth joints along the lines upon which the bearing surface has been broken.

6. In a method of providing a bearing for a member which has a body section and a separable cap section adapted to be bolted together and which when the sections are bolted together has an opening through the lengthwise axis of which the plane of separation substantially passes, the steps which comprise forming a bearing material receptacle in said opening which includes closures at both ends of the opening, flowing the bearing material into said receptacle until the receptacle is filled with bearing material, cooling and hardening the bearing material to thereby form a continuous unbroken surface, weakening the bearing layer along two lines which are substantially in a plane of bearing separation adjacent the plane of separation of the member, breaking the bearing along said weakened lines with the body section and the cap section each carrying a portion of the bearing material and bearing surface, and placing said parts together around the element with which the member is to be associated to form smooth joints along the lines upon which the bearing surface has been broken.

7. In a method of providing a bearing for a member which has a body section and a separable cap section adapted to be bolted together and which when the sections are bolted together has an opening through the lengthwise axis of which the plane of separation substantially passes, the steps which comprise forming a bearing material receptacle in said opening which includes closures at both ends of the opening, flowing the bearing material into said receptacle until the receptacle is filled with bearing material, cooling and hardening the bearing material to thereby form a continuous unbroken bearing surface, weakening the bearing layer along at least one line during the flow of the bearing material, breaking the bearing along said weakened line with the body section and the cap section each carrying a portion of the bearing material and bearing surface, and placing said parts together around the element with which the member is to be associated to form smooth joints along the lines upon which the bearing surface has been broken.

8. In a method of providing a bearing for a member which has a body section and a separable cap section adapted to be bolted together and which when the sections are bolted together has an opening through the lengthwise axis of which the plane of separation substantially passes, the steps which comprise forming a bearing material receptacle in said opening which includes closures at both ends of the opening, centering said member with respect to the walls of the receptacle, flowing the bearing material into said receptacle until the receptacle is filled with bearing material, cooling and hardening the bearing material to thereby form a continuous unbroken bearing surface, weakening the bearing layer during the flow of the bearing material along two lines which are substantially in a plane of bearing separation adjacent the plane of separation of the member, breaking the bearing along said weakened lines with the body section and cap section each carrying a portion of the bearing material and bearing surface, and placing said parts together around the element with which the member is to be associated to form smooth joints along the lines upon which the bearing surface has been broken.

9. In a method of providing a bearing for a member which has a body section and a separable cap section adapted to be bolted together and which when the sections are bolted together has an opening through the lengthwise axis of which the plane of separation substantially passes, the steps which comprise forming a mold for the reception of bearing material which includes walls at both ends of the opening, another wall of the mold being the wall of the member defining said opening, flowing the bearing material into said mold in a direction approximately normal to said axis, weakening the bearing layer during the flow of bearing material and without breaking the bearing surface, cooling and hardening the bearing material to thereby form a continuous unbroken bearing surface, breaking the bearing substantially at the weakening with the body section and the cap section each carrying a portion of the bearing material and bearing surface, and placing said parts together around the element with which the member is to be associated to form smooth joints along the lines upon which the bearing surface has been broken.

BURR W. MANTLE.